United States Patent [19]

LaConte

[11] Patent Number: 5,236,153
[45] Date of Patent: Aug. 17, 1993

[54] LONGITUDINAL FLOATING PIVOT TRACK FITTING

[76] Inventor: Richard J. LaConte, 17848 SE. 267th Pl., Kent, Wash. 98042

[21] Appl. No.: 904,236

[22] Filed: Jun. 25, 1992

[51] Int. Cl.$^5$ .................... B64D 11/06; F16B 37/08
[52] U.S. Cl. ................ 244/118.6; 244/122 R; 410/104; 410/105; 410/116
[58] Field of Search ............ 244/118.1, 118.6, 122 R, 244/137.1; 410/90, 101, 104, 105, 106, 107, 109, 115, 116, 77, 78, 79, 80, 81; 248/503.1

[56] References Cited

U.S. PATENT DOCUMENTS

| | | | |
|---|---|---|---|
| 3,263,629 | 8/1966 | Higuchi | 410/105 |
| 3,300,171 | 1/1967 | Watts | 410/116 |
| 3,422,508 | 1/1969 | Higuchi | 410/105 |
| 4,273,487 | 6/1981 | McLennan | 410/105 |

Primary Examiner—Joseph F. Peters, Jr.
Assistant Examiner—Virna Lissi Ansley

[57] ABSTRACT

A quick setting and releasing system for installing and removing fixtures in a longitudinal track comprises a bottom track having an inverted, T-shaped, longitudinal channel and a fixture track having a T-shaped, longitudinal channel. The actuating and locking mechanisms comprise a pair of wing shaped lugs which float on and pivot around a longitudinal pin to lock the lugs in the fixture channel when upward pressure is applied to the pin and in the bottom track when downward pressure is applied to the pin.

5 Claims, 3 Drawing Sheets

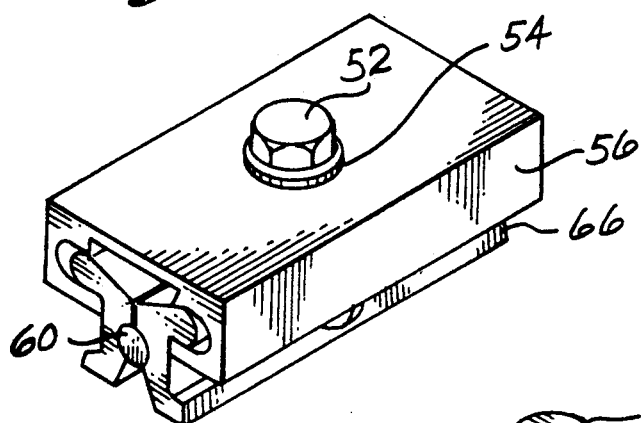
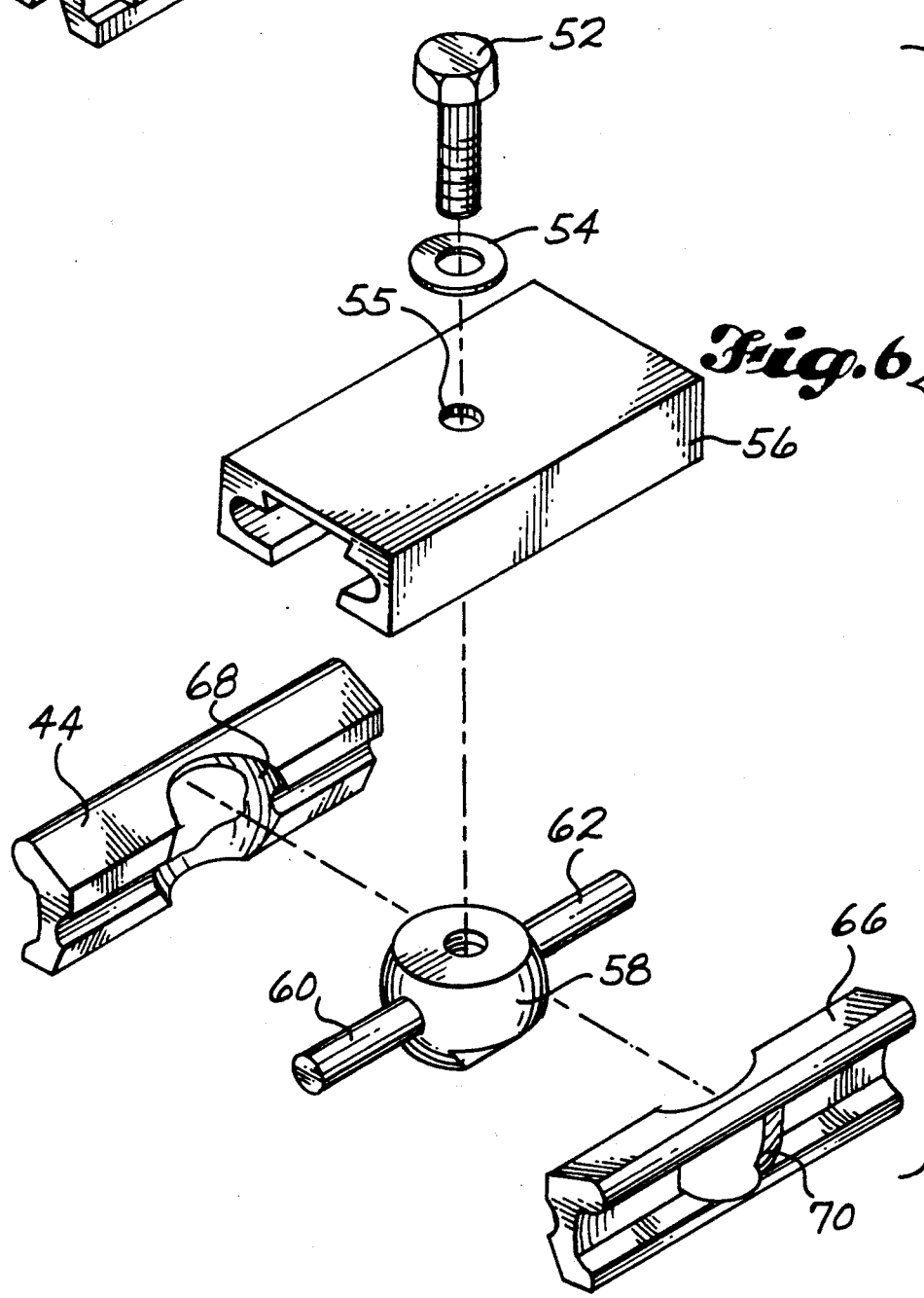

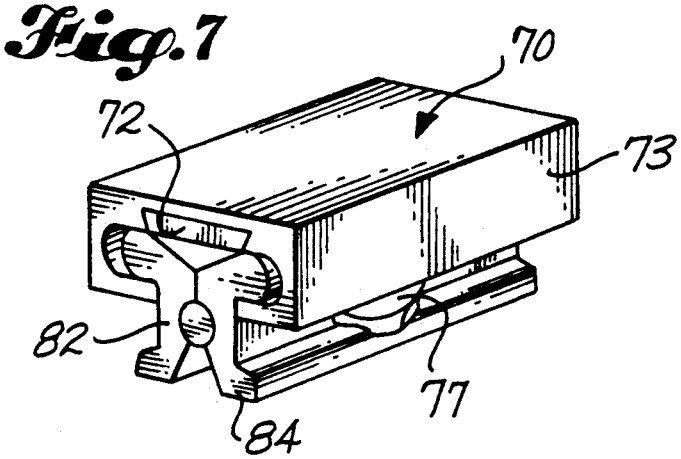
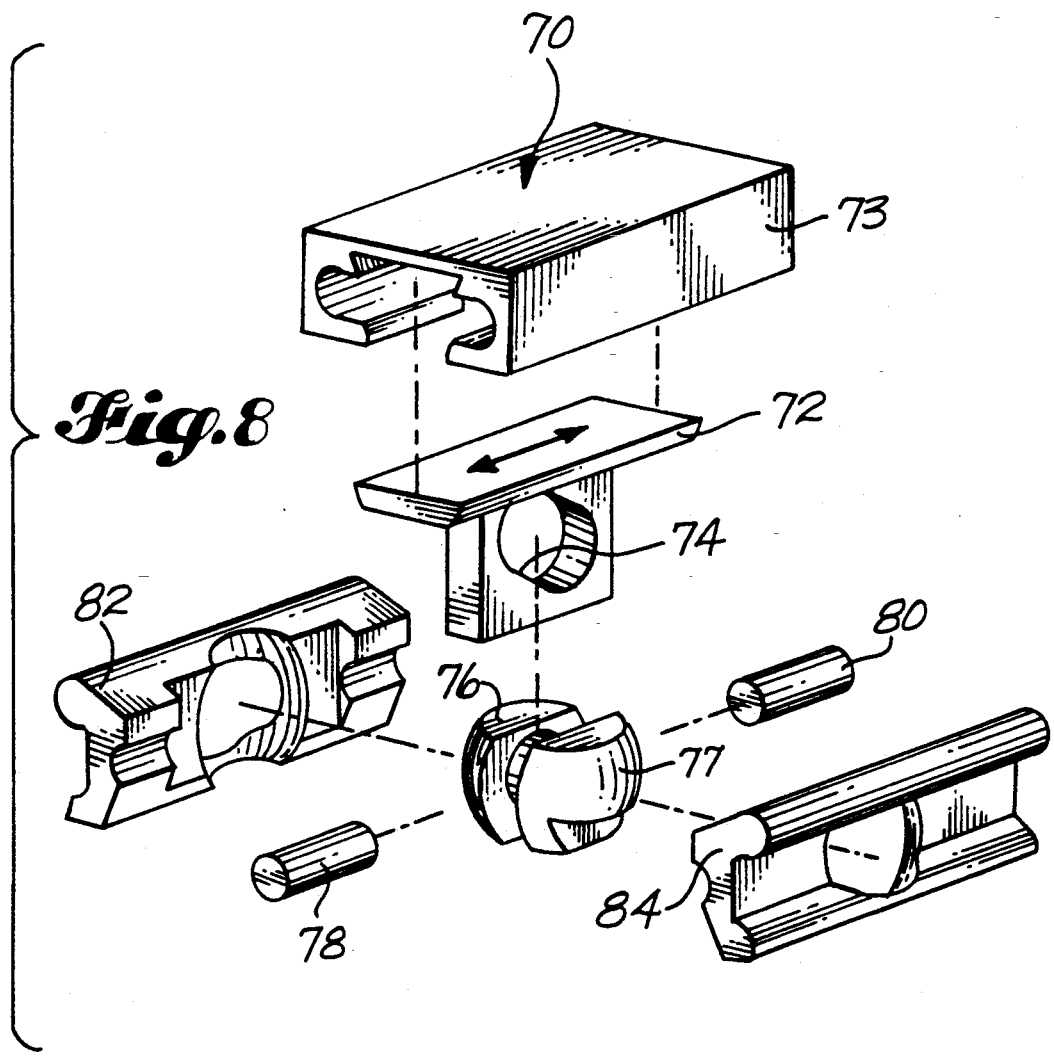

LONGITUDINAL FLOATING PIVOT TRACK FITTING

This invention relates to quick setting and releasing, longitudinal, floating pivot track fitting systems. More particularly, the invention relates to a flexible system for installing and removing fixtures in a longitudinal track.

BACKGROUND

In most commercial aircraft, fixtures such as seats, lavatories, bulkheads and galleys are secured to the cabin floor by individual lugs or multiple lugs dropped through cutouts in preplaced longitudinal tracks. The fixture must be negotiated carefully to drop several fixed connectors simultaneously through prepositioned cutouts in the track. The fixture is then translated to contact hold down tabs for the connectors and shear pins may be inserted. In some cases, additional antirattle or noise insulating features must be added and individually tightened down. This system of setting and releasing fixtures requires that the cutout holes be drilled precisely, and clearly limits potential locations for interior components such as seats. Furthermore, it is generally necessary to use more than one tool per fixture.

Accordingly, there has been a long-felt need in the art for a track fitting, particularly an existing floor seat track fitting, that may be inserted anywhere in a seat track and positioned anywhere in the fore and aft direction. There has also been a desire to provide clamp up indexing and antirattle engagements with a single tool or device, i.e. bolt, nut, handle, wrench, etc.

BRIEF SUMMARY

In accordance with a preferred embodiment, a quick setting and releasing system for installing and removing fixtures such as seats in aircraft flooring is provided. The system comprises a bottom track located in the floor which has an inverted T-shaped longitudinal channel running along its length. The fixture to be installed is provided with a fixture track that also has a T-shaped channel in it. The fastener mechanism comprises left and right lugs, each having butterfly wing-shaped top and bottom lobes. A pin is located between the lugs and is located such that a downward force causes the lugs to pivot so that the right and left fixture lobes come together while the track lobes are separated from each other thereby securing the track lobes in the widened portion of the T-shaped channel in the bottom or floor track.

To release the fixture, an upward force is applied to the pin or lugs, and the lugs pivot on the pin so that the left and right track lobes come together as the left fixture lobe and right fixture lobe are separated thereby securing the lugs in the T-shaped channel in the fixture track. The lugs and the pivot pin are sized to slide freely in the bottom track channel after an upward force has been applied.

My invention will be better understood in terms of the several figures and detailed description which follow.

In the figures:

FIG. 5 is a perspective view of quick setting and releasing system for installing a fixture in a floor track like that of FIGS. 3 and 4 also showing an actuating mechanism for the spherical plunger.

FIG. 6 is an exploded view of the quick setting and releasing system of FIG. 5.

FIG. 7 is a perspective view of quick setting and releasing system for installing a fixture in a floor track which features a slide for actuating the wing-shaped lugs on the pivot pin.

FIG. 8 is an exploded view of the quick setting and releasing system of FIG. 7.

DETAILED DESCRIPTION AND EXAMPLES

Figure 1:
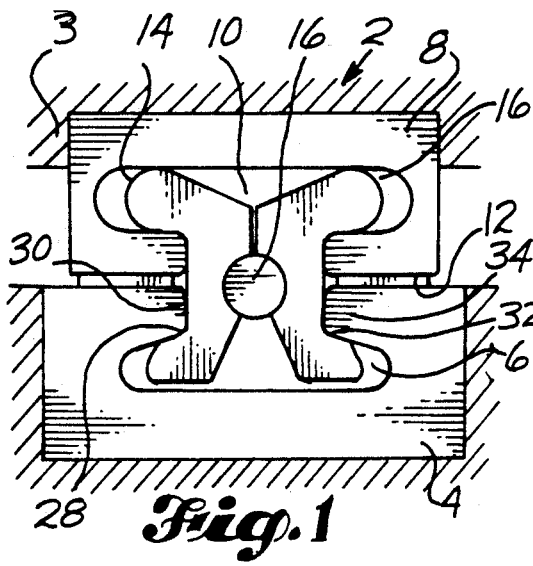
FIGS. 1 and 2 are end views of a quick setting and releasing system for installing a fixture in a floor track showing bottom and fixture tracks, left and right hand wings and pivot pin in the fixture-secured and installation positions, respectively.
Figure 2:
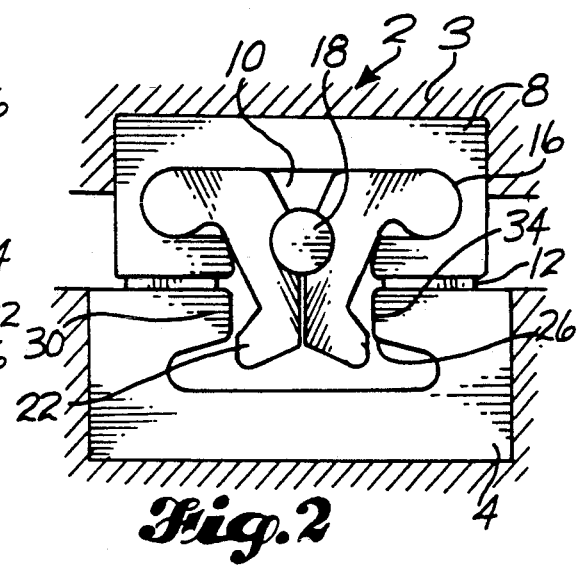

In accordance with a preferred embodiment and referring to FIGS. 1 and 2, a quick setting and releasing system 2 for positioning and holding fixtures such as airplane seats, is shown from the end. System 2 comprises bottom track 4 which may be mounted on top of, flush with, or recessed in a floor 5. Track 4 has inverted T-shaped channel 6 running in the direction of the length of track 4 at least in those locations where fixtures 3 are to be mounted.

Fixture 3 to be mounted has integral with or attached thereto fixture track 8. Fixture track 8 has inverted T-shaped channel 10 running in the direction of the length of track 4. An elastomeric seal 12 may be located between bottom track 4 and fixture track 8 to reduce noise and help prevent unwanted relative motion between tracks 4 and 8.

Key to the invention is the assembly of lefthand, wing-shaped lug 14, righthand, wing-shaped lug 16 and free floating pivot pin 18. Referring to FIG. 2, when fixture track 8 is being lowered onto or removed from bottom track 4, lefthand lug 14 and righthand lug 16 pivot on pin 18 such that the left and right bottom lobes, 22 and 26, are pressed together and left and right fixture lobes, 20 and 24, are separated and spread into the top section of channel 10. In this position, lobes 22 and 26 slide freely in bottom channel 6 anywhere along the length of track 4 so that fixture 3 may be easily positioned at any location. Fixture lobes 20 and 24 are held firmly and immobile in channel 10 of fixture track 8.

After fixture 3 has been properly positioned, downward pressure is applied to lugs 14 and 16 and/or pivot pin 18 resulting in a system 2 configuration like that shown in FIG. 1. Such downward pressure causes lugs 14 and 16 to rotate on pin 18 so that left and right fixture lobes, 20 and 24, come together as left and right bottom lobes 22 and 26 are spread apart. Lobes 22 and 26 are shaped such that left contact point 28 is established between lobe 22 and shoulder 30 of track 4 and right contact point 32 is established between lobe 26 and right shoulder 34. Once contact points 28 and 32 are established, the attached fixture is securely fastened to bottom track 4 and cannot move in any direction. One very important aspect of this embodiment of these quick installation systems is that the relative fore-and-aft position of a fixture is not predetermined by the location of predrilled holes or otherwise limited.

Figure 3:
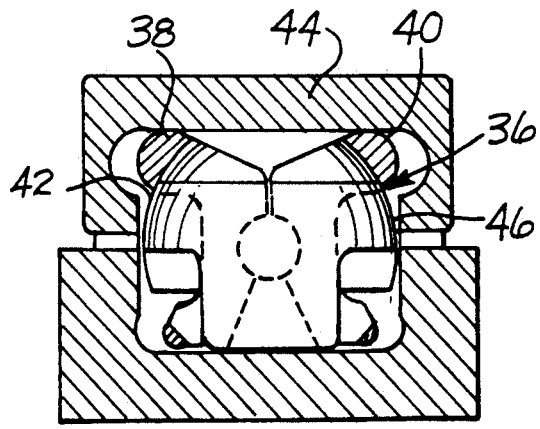
FIGS. 3 and 4 are sectional views of a quick setting and releasing system for installing a fixture in a floor track showing bottom and fixture tracks, left and right hand wings, spherical plunger and pivot pin in the fixture-secured and installation positions, respectively.
Figure 4:
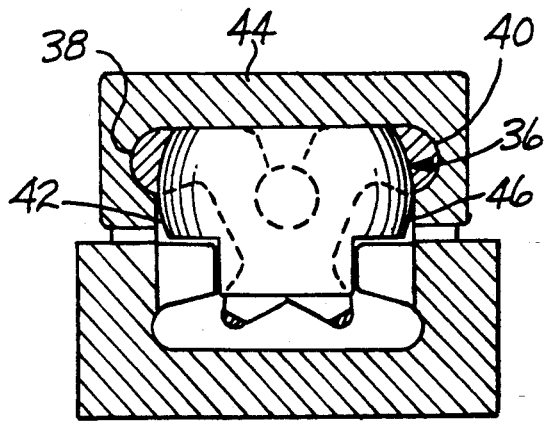

In another preferred embodiment shown in FIGS. 3 and 4, the action of spherical shear plunger 36 is shown. A downward force on plunger 36 forces lugs 38 and 40 to rotate around spherical surface 42 of plunger 36 and in base 44. This downward movement of spherical plunger 36 locks into preformed circular cutout 46 in base 44 as well as forcing lugs 38 and 40 into locked position. An upward force on plunger 36 disengages shear lock between plunger 36 and lugs 38 and 40, retracts plunger 36 from base 44, and retracts lugs 38 and 40 from base 44.

FIGS. 5 and 6 show bolt operated quick setting and releasing system 50 of the type described above with respect to FIGS. 3 and 4. Rotation of actuator bolt 52 and hole 55 in through nut 54 fixture track 56 pushing down on plunger 58. This affects a vertical motion and force on shear plunger 58 and pivot pins 60 and 62 causing rotation of lugs 64 and 66 around plunger 58 in lug cut-outs 68 and 69 and around pins 60 and 62 with associated locking and unlocking of an attached fixture from a bottom track (not shown).

FIGS. 7 and 8 show slide operated 72 in fixture track 73 quick install and release system 70. Linear motion and force of slide translates via a ramp 74 on slide 72 to vertical motion and force on left shear plunger 76 and right shear plunger 77 and pivot pins 78 and 80. This causes rotation of lugs 82 and 84 around pins 78 and 80 and within base cutouts 86 and 88 affecting locking and unlocking.

In summary, this invention solves the problem of rapidly installing and removing fixtures from tracks in flooring. More particularly, the problem of rapidly installing and removing seats using existing seat tracks in the passenger cabin of most commercial aircraft is solved. A subject fixturing system for a passenger seat, for example, may be inserted into an existing seat track at any location, clamped up with a single tool or by hand, and then be moved or removed with equal facility. The attachment is secure, and rattling due to seat fixturing is eliminated.

The invention also has practical application to "combi" aircraft, i.e., those aircraft which are reconfigurable to transport freight and passengers separately or in combination. Time saved in accomplishing reconfiguration of such aircraft may provide substantial cost savings to an aircraft operator. While the invention has been described in particular for installation of seats, other such systems may be used to secure galleys, lavatories, storage closets, etc.

While my invention has been disclosed in terms of specific embodiments thereof, other forms may be readily adapted by one skilled in the art. Accordingly, the scope of my invention is to be limited only in accordance with the following claims.

I claim:

1. A quick setting and releasing system for installing and removing fixtures in a longitudinal track, the system comprising a bottom track having an inverted, T-shaped, longitudinal channel therein; a fixture track having a T-shaped, longitudinal channel, therein; a lefthand lug having a wing shape comprising a top left fixture lobe and a left bottom lobe; a righthand lug having a wing shape comprising a top right fixture lobe and a right bottom lobe; a pin between the lefthand and righthand lugs located such that as a downward force is applied to the fixture track, the lugs pivot on said pin and the top left and top right fixture lobes come together as the left and right bottom lobes are separated thereby securing the track lobes in the widened portion of the T-shaped channel in the bottom track; and such that as an upward force is applied to the fixture track, the lugs pivot on the pin and the left and right bottom lobes come together as the top left and top right fixture lobes are separated, thereby securing the fixture lobes in the widened portion of the T-shaped channel in the fixture track; and wherein the system, the lugs and the pin are sized to slide freely in the bottom track when the left and right bottom lobes are together.

2. A quick setting and releasing system for installing and removing fixtures in a longitudinal track in an aircraft floor, the system comprising a bottom track having an inverted, T-shaped, longitudinal channel therein; a fixture track having a T-shaped, longitudinal channel therein; a lefthand lug having a wing shape comprising fixture lobe and a left bottom lobe; a, righthand lug having a wing shape comprising a top right fixture lobe and a right bottom lobe; a pin between the lefthand and righthand lugs located such that as a downward force is applied to the fixture track, the lugs pivot on said pin and the top left and top right fixture lobes come together as the left and right bottom lobes are separated thereby securing the track lobes in the widened portion of the T-shaped channel in the bottom track; and such that as an upward force is applied to the fixture track, the lugs pivot on the pin and the left and right bottom lobes come together as the top left and top right fixture lobes are separated, thereby securing the fixture lobes in the widened portion of the T-shaped channel in the fixture track; and wherein the system, the lugs and the pin are sized to slide freely in the bottom track when the left and right bottom lobes are together.

3. A quick setting and releasing system for installing and removing fixtures in a longitudinal track, the system comprising a bottom track having an inverted, T-shaped, longitudinal channel therein; a fixture track having a T-shaped, longitudinal channel therein; a lefthand lug having a wing shape comprising a left fixture lobe and a left bottom lobe; a righthand lug having wing shape comprising a top right fixture lobe and a right lobe, said lugs having a spherical hollow formed therebetween; a spherical shaped plunger which rotates and moves up and down in said spherical hollow; and a pin between the lefthand and righthand lugs located such that as a downward force is applied to said plunger, the lugs pivot on said pin and the top left and top right fixture lobes come together as the left and right bottom lobes are separated thereby securing the track lobes in the widened portion of the T-shaped channel in the bottom track; and such that as an upward force is applied thereto, the lugs pivot on the pin and the left and right bottom lobes come together as the top left and top right fixture lobes are separated, thereby securing the fixture lobes in the widened portion of the T-shaped channel in the fixture track.

4. The system of claim 3 further comprising a bolt for pushing said plunger in a downward direction.

5. A quick setting and releasing system for installing and removing fixtures in a longitudinal track, the system comprising a bottom track having an inverted, T-shaped, longitudinal channel therein; a fixture track having a T-shaped, longitudinal channel therein; a lefthand lug having a wing shape comprising a to top left fixture lobe and a left bottom lobe; a righthand lug having a wing shape comprising a top right fixture lobe and a right bottom lobe, said lugs having a spherical hollow formed therebetween; a spherical-shaped plunger which rotates and moves up and down in said spherical hollow; a pin between the lefthand and righthand lugs located such that as a downward force is applied to said plunger the lugs pivot on said pin and the top left and top right fixture lobes come together as the left and right bottom lobes are separated thereby securing the track lobes in the widened portion of the T-shaped channel in the bottom track; and such that as an upward force is applied thereto, the lugs pivot on the pin and the left and right bottom lobes come together as the top left and top right fixture lobes are separated thereby securing the fixture lobes in the widened portion of the T-shaped channel in the fixture track; and a slide within said fixture channel having a ramp which applies downward force on said plunger when it is translated in the channel.

* * * * *